(12) United States Patent
Lee et al.

(10) Patent No.: US 12,239,864 B2
(45) Date of Patent: Mar. 4, 2025

(54) BATTERY MODULE HAVING FIRE-EXTINGUISHING UNIT

(71) Applicant: LG ENERGY SOLUTION, LTD., Seoul (KR)

(72) Inventors: Han Young Lee, Daejeon (KR); Jun Soo Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 433 days.

(21) Appl. No.: 17/791,750

(22) PCT Filed: Nov. 12, 2020

(86) PCT No.: PCT/KR2020/015842
§ 371 (c)(1),
(2) Date: Jul. 8, 2022

(87) PCT Pub. No.: WO2021/225238
PCT Pub. Date: Nov. 11, 2021

(65) Prior Publication Data
US 2023/0035877 A1    Feb. 2, 2023

(30) Foreign Application Priority Data

May 4, 2020    (KR) .......................... 10-2020-0053495

(51) Int. Cl.
*H01M 10/613* (2014.01)
*A62C 3/16* (2006.01)
(Continued)

(52) U.S. Cl.
CPC ................ *A62C 3/16* (2013.01); *A62C 35/10* (2013.01); *B26D 1/0006* (2013.01);
(Continued)

(58) Field of Classification Search
CPC ........ A62C 3/16; A62C 35/10; H01M 10/425; H01M 10/613; H01M 10/647; H01M 50/673
See application file for complete search history.

(56) References Cited

U.S. PATENT DOCUMENTS

| | | | |
|---|---|---|---|
| 2006/0246345 A1 | 11/2006 | Yoon et al. | |
| 2007/0037058 A1 | 2/2007 | Visco et al. | |

(Continued)

FOREIGN PATENT DOCUMENTS

| | | | |
|---|---|---|---|
| CN | 101313426 A | 11/2008 | |
| CN | 191682186 A | 3/2010 | |

(Continued)

OTHER PUBLICATIONS

Extended European Search Report for European Application No. 20934875.4, dated Jul. 3, 2024.

(Continued)

*Primary Examiner* — Kevin E Yoon
(74) *Attorney, Agent, or Firm* — Birch, Stewart, Kolasch & Birch, LLP (57) ABSTRACT

A battery module having a fire-extinguisher, and more particularly to a battery module having a fire-extinguisher, the battery module including a plurality of battery cells stacked in a vertical direction or a horizontal direction and a fire-extinguisher located adjacent to each of the battery cells, wherein the fire-extinguisher includes a fire-extinguishing pack containing a tire-extinguishing material, a piezoelectric element interposed between the battery cell and the fire-extinguishing pack, and at least one breaking unit interposed between the battery cell and the fire-extinguishing pack.

11 Claims, 6 Drawing Sheets

(51) Int. Cl.
   | | |
   |---|---|
   | *A62C 35/10* | (2006.01) |
   | *B26D 1/00* | (2006.01) |
   | *H01M 10/42* | (2006.01) |
   | *H01M 10/647* | (2014.01) |
   | *H01M 50/211* | (2021.01) |
   | *H01M 50/673* | (2021.01) |

(52) U.S. Cl.
   CPC ....... *H01M 10/425* (2013.01); *H01M 10/613* (2015.04); *H01M 10/647* (2015.04); *H01M 50/211* (2021.01); *H01M 50/673* (2021.01); *B26D 2001/002* (2013.01); *B26D 2001/0033* (2013.01); *B26D 2001/006* (2013.01); *H01M 2200/10* (2013.01); *H01M 2200/20* (2013.01)

(56) References Cited

U.S. PATENT DOCUMENTS

| | | |
|---|---|---|
| 2007/0051620 A1 | 3/2007 | Visco et al. |
| 2007/0210752 A1 | 9/2007 | Yoon |
| 2008/0182157 A1 | 7/2008 | Visco et al. |
| 2010/0112454 A1 | 5/2010 | Visco et al. |
| 2011/0005781 A1 | 1/2011 | Yasui et al. |
| 2011/0037430 A1 | 2/2011 | Jang |
| 2012/0094194 A1 | 4/2012 | Visco et al. |
| 2012/0258347 A1 | 10/2012 | Yokoyama et al. |
| 2013/0224593 A1 | 8/2013 | Visco et al. |
| 2013/0302704 A1 | 11/2013 | Visco et al. |
| 2014/0162108 A1 | 6/2014 | Visco et al. |
| 2014/0170447 A1 | 6/2014 | Woehrle et al. |
| 2015/0001994 A1 | 1/2015 | Ahn et al. |
| 2015/0268724 A1 | 9/2015 | Levesque et al. |
| 2016/0008646 A1 | 1/2016 | Frasure et al. |
| 2016/0028063 A1 | 1/2016 | Visco et al. |
| 2018/0157327 A1 | 6/2018 | Levesque et al. |
| 2020/0038698 A1 | 2/2020 | Ryu et al. |
| 2020/0078623 A1 | 3/2020 | Ling et al. |

FOREIGN PATENT DOCUMENTS

| | | | | |
|---|---|---|---|---|
| CN | 103826805 A | 5/2014 | | |
| CN | 106133636 A | 11/2016 | | |
| CN | 109036148 A | 12/2018 | | |
| DE | 31 51 469 A1 | 7/1983 | | |
| JP | 2007-27011 A | 2/2007 | | |
| JP | 2007-109455 A | 4/2007 | | |
| JP | 2007-250545 A | 9/2007 | | |
| JP | 2008-99322 A | 5/2009 | | |
| JP | 2010-97836 A | 4/2010 | | |
| JP | 2012-129009 A | 7/2012 | | |
| JP | 2012-221717 A | 11/2012 | | |
| JP | 2014-165028 A | 9/2014 | | |
| JP | 2015-162285 A | 9/2015 | | |
| JP | 2018-19734 A | 2/2016 | | |
| JP | 2020-500401 A | 1/2020 | | |
| KR | 10-2006-0110576 | 10/2006 | | |
| KR | 10-2007-0052375 A | 5/2007 | | |
| KR | 1020070056494 A | * 6/2007 | ............ | H01M 10/42 |
| KR | 10-2009-0113521 A | 11/2009 | | |
| KR | 10-2012-0131300 A | 12/2012 | | |
| KR | 10-2013-0078963 A | 7/2013 | | |
| KR | 10-1287848 B1 | 7/2013 | | |
| KR | 10-2014-0005323 A | 1/2014 | | |
| KR | 10-2016-0032843 A | 3/2016 | | |
| KR | 10-2018-0124439 A | 11/2018 | | |
| KR | 10-1984817 B1 | 5/2019 | | |
| KR | 10-2019-0086115 A | 7/2019 | | |
| KR | 10-2020-0028712 A | 3/2020 | | |

OTHER PUBLICATIONS

International Search Report (PCT/ISA/210) issued in PCT/KR2020/015842, dated Feb. 19, 2021.

* cited by examiner

[FIG. 1]

Conventional Art

BATTERY MODULE HAVING FIRE-EXTINGUISHING UNIT

TECHNICAL FIELD

This application claims the benefit of priority to Korean Patent Application No. 2020-0053495 filed on May 4, 2020, the disclosure of which is incorporated herein by reference in its entirety.

The present invention relates to a battery module having a fire-extinguishing unit, and more particularly to a battery module having a fire-extinguishing unit including a fire-extinguishing material capable of sprinkling a fire-extinguishing material without a separate sensing device when a battery cell swells or inflammable gas is generated in the battery cell, whereby it is possible to improve safety and energy density of the battery module.

BACKGROUND ART

A secondary battery, which has high ease of application based on product family and electrical characteristics, such as high energy density, has been universally applied to an electric vehicle (EV) or a hybrid electric vehicle (HEV) driven by an electrical driving source as well as portable devices. Such a secondary battery has attracted attention as a new energy source capable of enhancing environmental friendliness and energy efficiency in that the secondary battery has a primary advantage of remarkably reducing the use of fossil fuels and in that no by-products due to the use of energy are generated.

There are a lithium ion battery, a lithium polymer battery, a nickel-cadmium battery, a nickel-hydride battery, and a nickel-zinc battery as secondary batteries that are widely used at present. The operating voltage of such a unit secondary battery cell, i.e. a unit battery cell, is about 2.5V to 4.5V. In the case in which output voltage higher than the above operating voltage is required, therefore, a plurality of battery cells may be connected to each other in series to constitute a battery module.

Of course, a plurality of battery modules may be connected to each other in parallel or in series depending on required charge and discharge capacities to constitute a battery pack.

Meanwhile, in order to satisfy required output voltage, a plurality of battery cells is received in a battery module. The received battery cells are disposed in tight contact with each other in order to improve energy density. When an issue, such as thermal runaway, occurs, therefore, a secondary accident, such as generation of gas and outbreak of fire, may occur.

Figure 1:
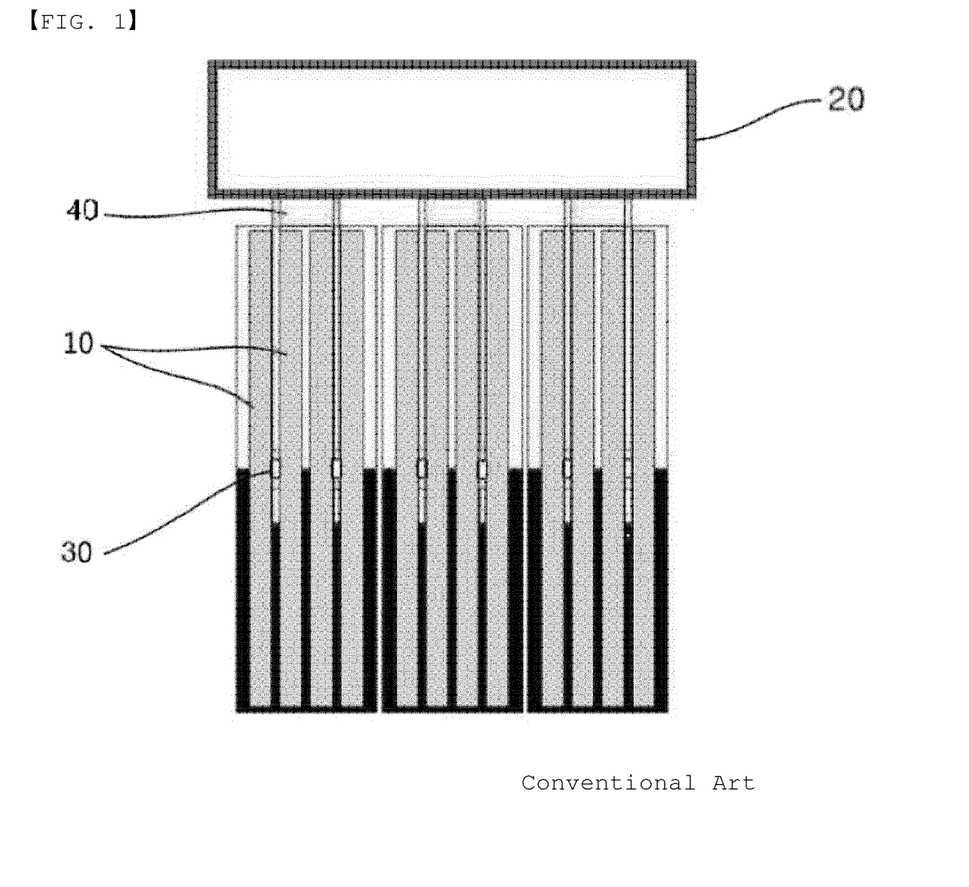
FIG. 1 is a view illustrating extinguishment of fire in a battery module using a conventional fire-extinguishing unit.

In connection therewith, FIG. 1 is a view illustrating extinguishment of fire in a battery module using a conventional fire-extinguishing unit. Referring to FIG. 1, the battery module is configured such that a fire-extinguishing unit 20 containing a fire-extinguishing material is located above a plurality of battery cells 10 and an opening (not shown) is formed in the lower part of the fire-extinguishing unit 20. A piezoelectric sensor 30 is interposed between the battery cells 10. When the volume of the battery cells 10 increases due to swelling thereof, the piezoelectric sensor senses pressure and transmits an electrical signal to a control device, such as a BMS, via a connection circuit 40. Upon determining that the sensed pressure is equal to or higher than a predetermined level, the opening is opened, whereby the fire-extinguishing material is ejected.

In the conventional art, the piezoelectric sensor 30 configured to sense pressure and the connection circuit 40 configured to transmit the electrical signal generated by the piezoelectric sensor are provided. In the case in which the connection circuit 40 is damaged, there may be a problem in injecting the fire-extinguishing material. Furthermore, separate devices, such as the connection circuit 40 and the BMS, and an additional device and space for fixing the separate devices are necessary, whereby a manufacturing process is complicated and energy density is low.

PRIOR ART DOCUMENT (Patent Document 1) Korean Patent Application Publication No. 2013-0078953

DISCLOSURE

Technical Problem

The present invention has been made in view of the above problems, and it is an object of the present invention to provide a battery module having a fire-extinguishing unit capable of sensitively responding to change in volume of the battery module to secure safety, whereby it is possible to reduce occurrence of secondary accidents.

It is another object of the present invention to provide a battery module having a fire-extinguishing unit capable of improving space utilization in the battery module while maintaining fire-extinguishing performance, whereby it is possible to improve energy density.

Technical Solution

In order to accomplish the above objects, a battery module according to the present invention includes a plurality of battery cells stacked in a first direction and a plurality of fire-extinguishers respectively located adjacent to the plurality of battery cells, wherein the fire-extinguisher includes a fire-extinguishing pack containing a fire-extinguishing material, a piezoelectric element interposed between a respective battery cell and the fire-extinguishing pack, and at least one breaking unit interposed between the respective battery cell and the fire-extinguishing pack.

Also, in the battery module according to the present invention, the fire-extinguishing pack may be in contact with one surface or opposite surfaces of the respective battery cell.

Also, in the battery module according to the present invention, the piezoelectric element may be located at the middle of one surface of the respective battery cell, and a connection circuit may be provided between the piezoelectric element and the breaking unit.

Also, in the battery module according to the present invention, the breaking unit may include a coupler fixed to the respective battery cell or the fire-extinguishing pack and a blade extending from the coupler, and the blade may be made of an electroactive polymer.

Also, in the battery module according to the present invention, the breaking unit may be located adjacent to an electrode lead of the respective battery cell.

Also, in the battery module according to the present invention, the blade may be deformed by a predetermined angle by voltage generated from the piezoelectric element to rupture the fire-extinguishing pack.

Also, in the battery module according to the present invention, the blade portion may be a plurality of blades provided along a plurality of edges of the coupler.

Also, in the battery module according to the present invention, the blade may have a thickness equal to the thickness of the coupler.

Also, in the battery module according to the present invention, the blade may have a thickness gradually decreasing with increasing distance from the edge of the coupler.

Also, in the battery module according to the present invention, a recessed portion may be formed in where the blade and the coupler are connected to each other.

In addition, a battery pack according to the present invention includes the battery module.

Advantageous Effects

A battery module having a fire-extinguishing unit according to the present invention has an advantage in that a breaking unit made of an electroactive polymer, which is deformed by an electrical signal, is located in tight contact with a battery cell, whereby it is possible to extinguish fire without recognition through a separate sensing device, and therefore it is possible to prevent non-operation due to systemic errors.

In addition, the battery module according to the present invention has an advantage in that a sensing device configured to sense temperature or voltage of the battery module and a separate device configured to fix the breaking unit are not necessary, whereby a manufacturing process is simple and energy density is improved.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having a fire-extinguishing unit including a fire-extinguishing material according to the present invention will be described with reference to the accompanying drawings.

Figure 2:
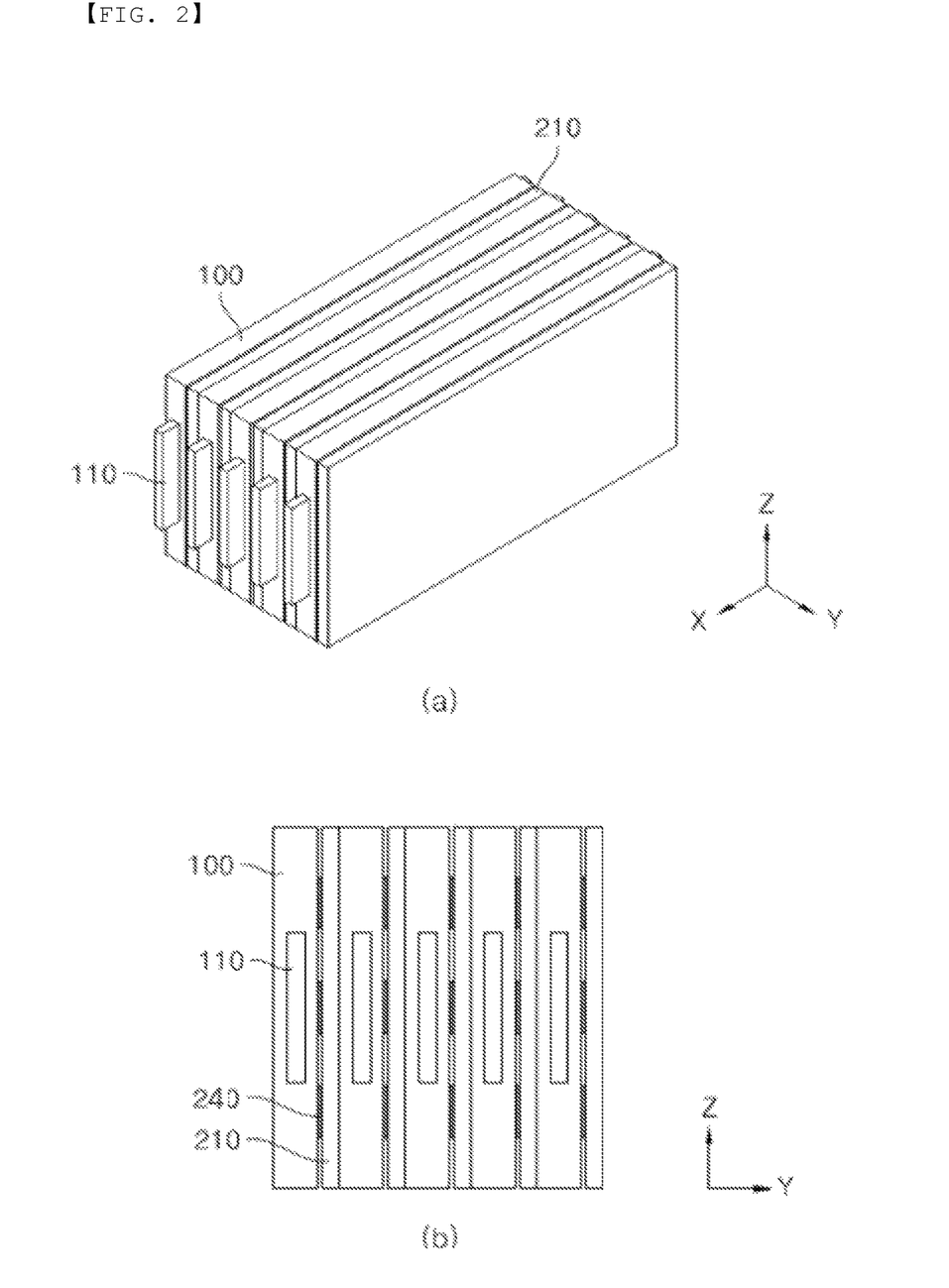
FIG. 2 is a perspective view and a side front view of a battery module according to a first preferred embodiment of the present invention.
Figure 3:
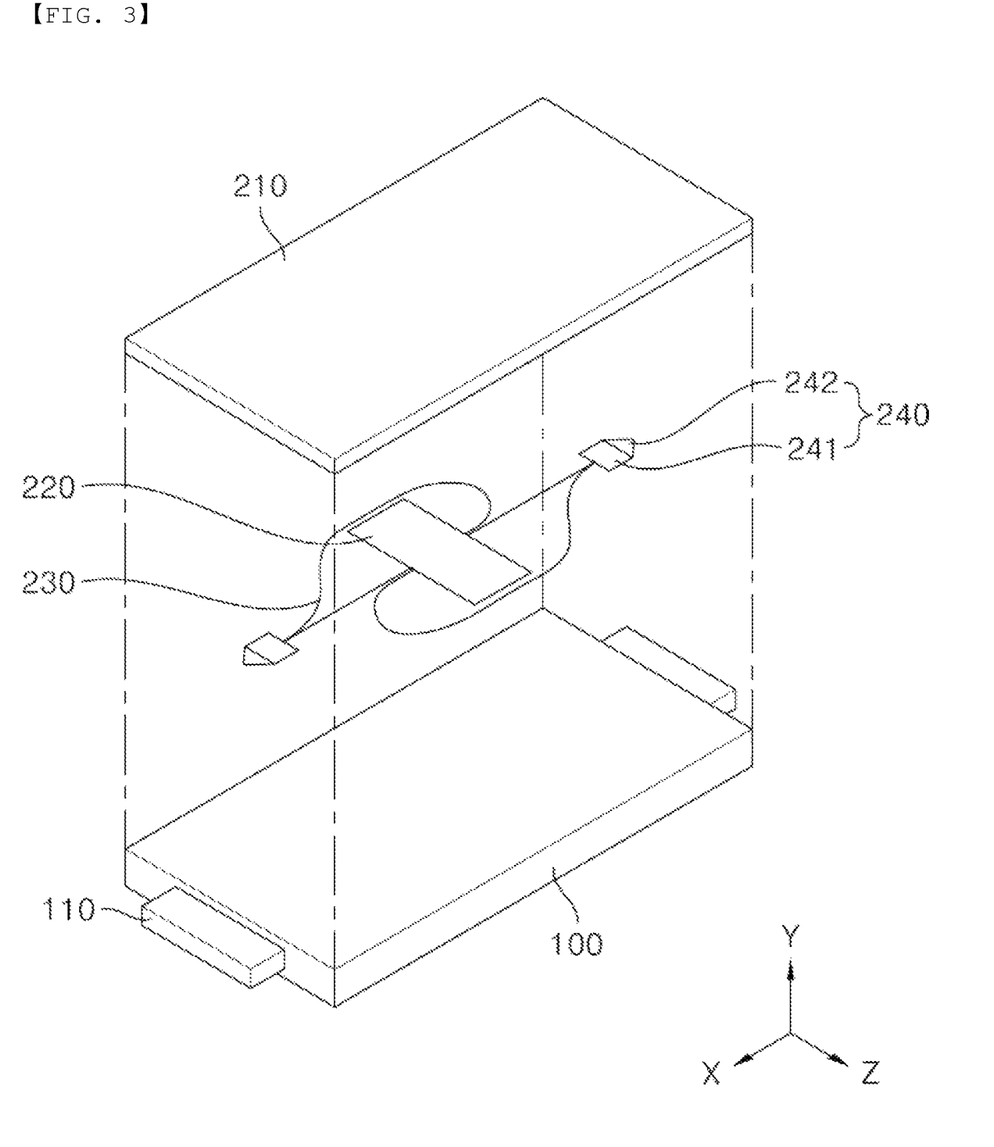
FIG. 3 is an exploded perspective view of a battery cell and a fire-extinguishing unit according to a first preferred embodiment of the present invention.

FIG. 2 is a perspective view and a side front view of a battery module according to a first preferred embodiment of the present invention, and FIG. 3 is an exploded perspective view of a battery cell and a fire-extinguishing unit according to a first preferred embodiment of the present invention.

Referring to FIGS. 2 and 3, the battery module having the fire-extinguishing unit according to the present invention includes a plurality of battery cells 100 and a fire-extinguishing unit 200.

First, the plurality of battery cells 100 may be stacked side by side in a vertical direction or in a horizontal direction with respect to the ground and may be connected to each other in series and in parallel.

Here, it is preferable for each of the battery cells 100 to be a pouch-shaped battery cell including a cell assembly (not shown), a cell case, and a pair of electrode leads 110. The cell assembly may be a jelly-roll type cell assembly, which is configured to have a structure in which a long sheet type positive electrode and a long sheet type negative electrode are wound in the state in which a separator is interposed therebetween, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other. However, the present invention is not limited thereto.

The cell assembly is mounted in the cell case. The cell case is generally configured to have a laminate sheet structure including an inner layer, a metal layer, and an outer layer. The inner layer is disposed in direct contact with the cell assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, the pair of electrode leads 110 includes a positive electrode lead and a negative electrode lead. The positive electrode lead and the negative electrode lead may be exposed outwards from the cell case in the state in which positive electrode tabs and negative electrode tabs of the cell assembly are electrically connected to the positive electrode lead and the negative electrode lead, respectively, or the positive electrode lead and the negative electrode lead may be directly connected to the cell assembly without electrode tabs. The battery cells correspond to commonly known constructions, and therefore a more detailed description thereof will be omitted.

Next, the fire-extinguishing unit 200 will be described in detail. The fire-extinguishing unit 200 includes a fire-extinguishing pack 210, a piezoelectric element 220, a connection circuit 230, and a breaking unit 240.

The fire-extinguishing pack 210 may have defined therein a space configured to receive a fire-extinguishing material, and may be made of at least one of a polyolefin-based resin, such as polypropylene, polyethylene, polyethylene acrylate, or polybutylene, polytetrafluoroethylene, a polyurethane resin, and a polyimide resin, each of which has a predetermined thickness that can be torn by the breaking unit 240. In addition, the fire-extinguishing pack 210 may be located at one surface or opposite surfaces of each of the battery cells 100, and may be prismatic, which is similar to the outer shape of the battery cell 100. However, the fire-extinguishing pack may be amorphous, whereby the shape of the fire-extinguishing pack may be freely changed.

A fire-extinguishing material configured to inhibit an increase in temperature of the battery cells 100 to a predetermined temperature or higher or flames generated by outbreak of fire is contained in the fire-extinguishing pack 210. At least one of inorganic carbonate, inorganic phosphate, inorganic sulfate, sodium bicarbonate, potassium bicarbonate, and ammonium phosphate monobasic may be used as an example of the fire-extinguishing material. However, the fire-extinguishing material is not particularly restricted as long as the fire-extinguishing material is a material having a fire-extinguishing function.

Here, it is more preferable for the fire-extinguishing material to be liquid such that the fire-extinguishing material can be rapidly discharged, although the fire-extinguishing material may be powder.

The piezoelectric element 220, which is an element in which a piezoelectric phenomenon occurs, is also called a piezoelectric effect element. Crystalline quartz, tourmaline, or potassium sodium tartrate is commonly used as a raw material for the piezoelectric element 220. In recent years, an artificial crystal, such as barium titanate, ammonium dihydrogen phosphate, or ethylenediamine tartrate, has been used. The material for the piezoelectric element is well known, and therefore a detailed description thereof will be omitted.

Here, the piezoelectric phenomenon, which is a phenomenon in which mechanical energy is converted into electrical energy, means a reversible phenomenon in which, when external force and vibration are applied to the piezoelectric element, positive charges and negative charges proportional to the external force are generated from opposite ends of the piezoelectric element, whereby an electrical signal is generated.

When the battery cell 100 swells or inflammable gas is generated in the battery cell, the piezoelectric element 220 generates voltage. That is, when gas is generated in the battery cell 100, the volume of the battery cell increases, and therefore pressure is applied to opposite surfaces of the piezoelectric element 220, which is located between the battery cell 100 and the fire-extinguishing pack 210 in tight contact therewith, whereby voltage is generated.

Here, it is preferable for the piezoelectric element 220 to be located adjacent to the middle of the battery cell 100. The reason for this is that, when the battery cell 100 swells, the volume of the battery cell at the middle thereof is first changed, whereby the piezoelectric element can more rapidly respond thereto.

The connection circuit 230 is located between the piezoelectric element 220 and the breaking unit 240 so as to electrically connect the piezoelectric element and the breaking unit to each other. That is, the connection circuit transmits voltage generated from the piezoelectric element 220 to the breaking unit 240 such that the shape of the breaking unit 240 is changed.

The breaking unit 240 includes a coupling portion 241 fixed to a predetermined part of the battery cell 100 or the fire-extinguishing pack 210 and a blade portion 242 extending from the edge of one side of the coupling portion 221.

The coupling portion 241 is fixed to the battery cell 100 or the fire-extinguishing pack 210 in order to prevent movement of the breaking unit 240. The blade portion 242 tears or breaks the fire-extinguishing pack 210 in order to discharge the fire-extinguishing material contained therein.

Here, it is preferable for the blade portion 242 to be configured such that the width of the blade portion (Y-axis direction) gradually decreases with increasing distance from the coupling portion 241 so as to have a pointed shape.

Meanwhile, it is preferable for the breaking unit 240 to be made of an electroactive polymer such that the shape of the blade portion 242 is changed by the voltage generated from the piezoelectric element 220, which will be described below in more detail.

The position of the breaking unit 240 is not particularly restricted as long as the breaking unit comes into tight contact with the fire-extinguishing pack 210. Preferably, the breaking unit is located in the vicinity of each of the electrode leads 110. More preferably, two or more breaking units are provided. The reason for this is that, when heat is generated from the battery cell 100 due to overcharging, a larger amount of heat is generated in the vicinity of each of the electrode leads 110, and therefore it is advantageous to first discharge the fire-extinguishing material to the vicinity of each of the electrode leads 110 in order to prevent occurrence of a secondary event.

Figure 4:
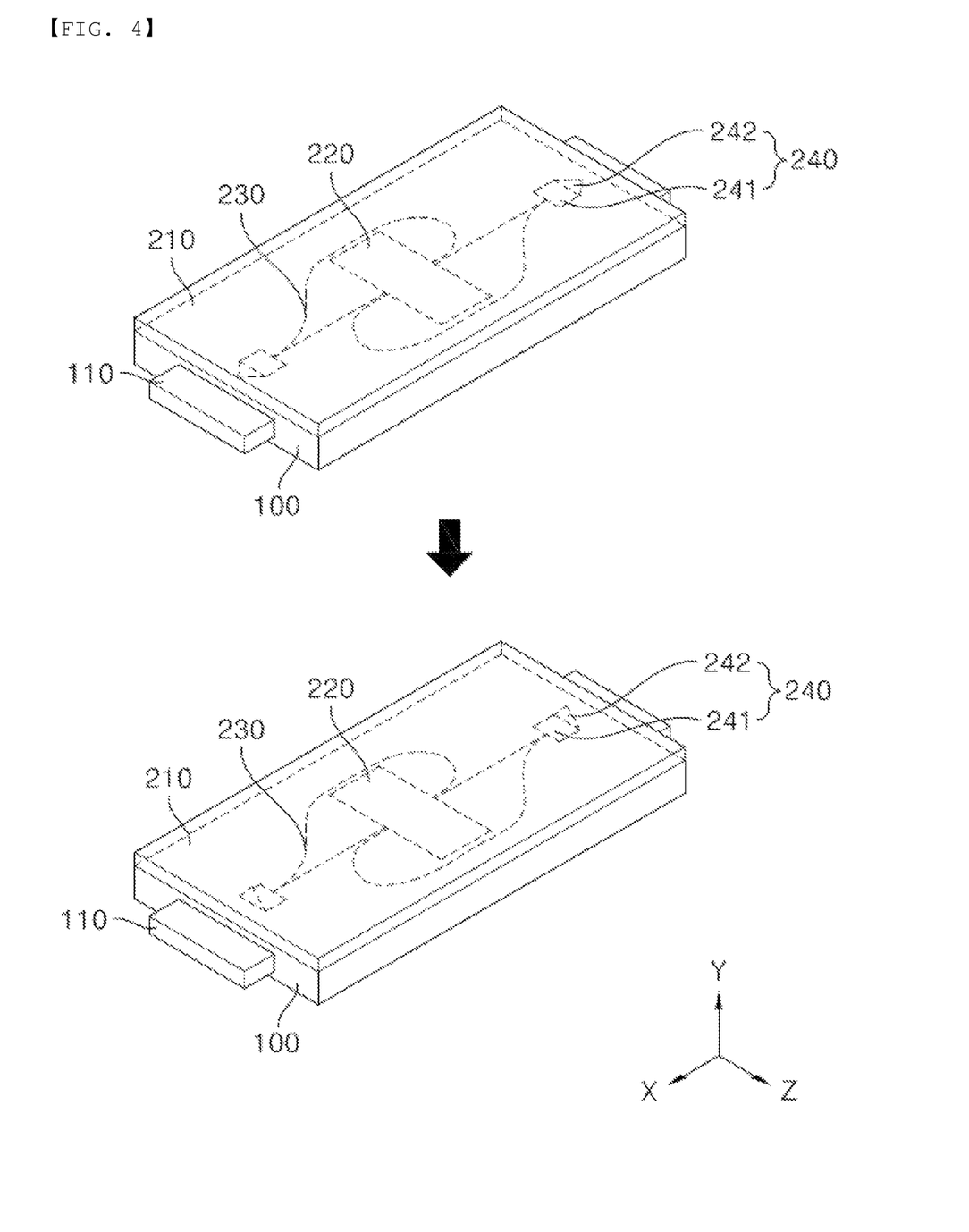
FIG. 4 is a view illustrating change of the fire-extinguishing unit depending on an increase in volume of the battery cell according to the first preferred embodiment of the present invention.

FIG. 4 is a view illustrating change of the fire-extinguishing unit depending on an increase in volume of the battery cell according to the first preferred embodiment of the present invention.

Referring to FIG. 4, the shape of the breaking unit 240 is changed when voltage is applied thereto, since the breaking unit is made of an electroactive polymer, the shape of which is changed when voltage is applied thereto, as previously described.

That is, when the battery cell 100 is repeatedly charged and discharged in a normal state, as shown in FIG. 4, the coupling portion 241 and the blade portion 242 are simply disposed in tight contact between the battery cell 100 and the fire-extinguishing pack 210. However, when the volume of the battery cell increases due to overcharging and thus voltage is generated from the piezoelectric element 220, the voltage is transferred to the breaking unit 240 via the connection circuit 230, whereby the blade portion 242 rises by a predetermined angle, i.e. the shape of the blade portion is changed.

A portion of the fire-extinguishing pack 210 ruptures as the result of deformation of the blade portion 242. As a result, the fire-extinguishing material contained in the fire-extinguishing pack is ejected to control overheating or fire of the battery cell 100.

Since the breaking unit 240 according to the present invention is a thin flat plate that is located between the battery cell 100 and the fire-extinguishing pack 210 and that is made of an electroactive polymer, which is deformed when voltage is applied thereto, as described above, a space occupied by the breaking unit is small, unlike a sensing device configured to sense temperature and voltage, whereby space utilization is improved, and therefore it is possible to improve energy density of the battery module.

Here, the electroactive polymer is classified as an ionic electroactive polymer (EAP), which contracts and expands due to movement and diffusion of ions when external voltage is applied thereto, or an electronic electroactive polymer (EAP), which is deformed by an electronic polarization phenomenon, based on the operation mode thereof. Examples of the ionic electroactive polymer include electrorheological fluids (ERP), carbon nanotubes (CNT), conductive polymers (CP), ionic polymer-metal composites (IPMC), and ionic polymergels (IPG). The ionic electroactive polymer has various advantages such as high operating force, rapid response speed, and low application voltage.

Figure 5:
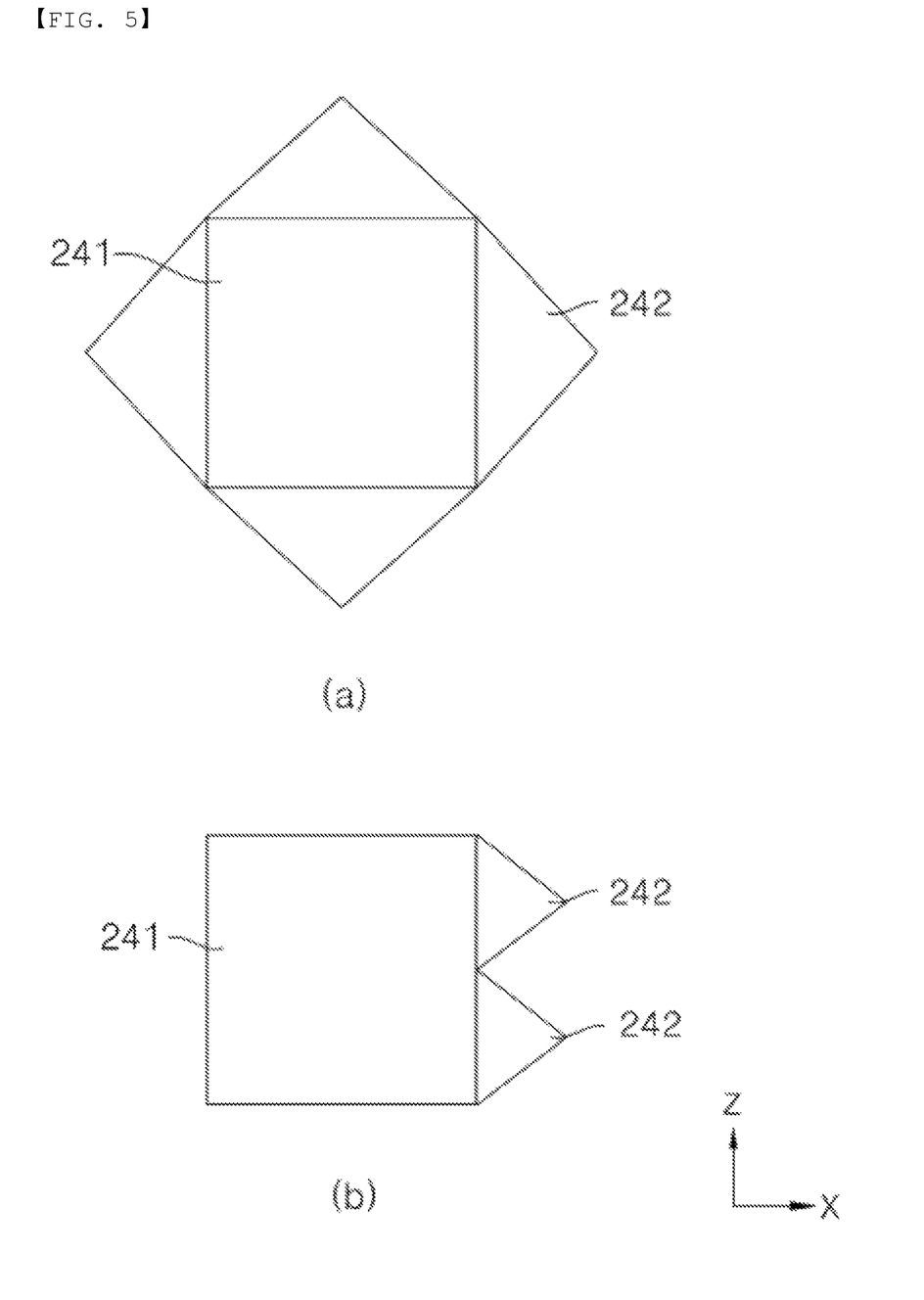
FIG. 5 is a plan view illustrating breaking units according to second and third preferred embodiments of the present invention.

FIG. 5 is a plan view illustrating breaking units according to second and third preferred embodiments of the present invention.

Referring to FIG. 5, (a) of FIG. 5 is a plan view of the breaking unit 240 according to the second preferred embodiment of the present invention, wherein four blade portions 242 are formed along the edge of a quadrangular coupling portion 241.

In the breaking unit 240 according to the second embodiment, when the volume of the battery cell 100 increases due to a swelling phenomenon thereof and voltage generated thereby is transmitted to the breaking unit, the four blade portions 242 rise by a predetermined angle to rupture a portion of the fire-extinguishing pack 210. Consequently, it is possible to induce rapid discharge of the fire-extinguishing material while reducing the installation number of the breaking unit 240.

In the breaking unit 240 according to the third embodiment shown in (b) of FIG. 5, two blade portions 242 are formed at one side of a quadrangular coupling portion 241.

In the breaking unit 240 according to the third embodiment, when the volume of the battery cell 100 increases due to a swelling phenomenon thereof and voltage generated thereby is transmitted to the breaking unit, the two blade portions 242 rise by a predetermined angle to rupture a portion of the fire-extinguishing pack 210. Consequently, it is possible to induce rapid discharge of the fire-extinguishing material while reducing the installation number of the breaking unit 240.

Of course, two blade portions 242 according to the third embodiment may be provided at one side of the quadrangular coupling portion 241 according to the second embodiment, the shape of the coupling portion 241 may be polygonal, for example triangular, pentagonal, hexagonal, or octagonal, or circular, and three or more blade portions 242 may be formed at the edge of one side of the coupling portion.

Figure 6:
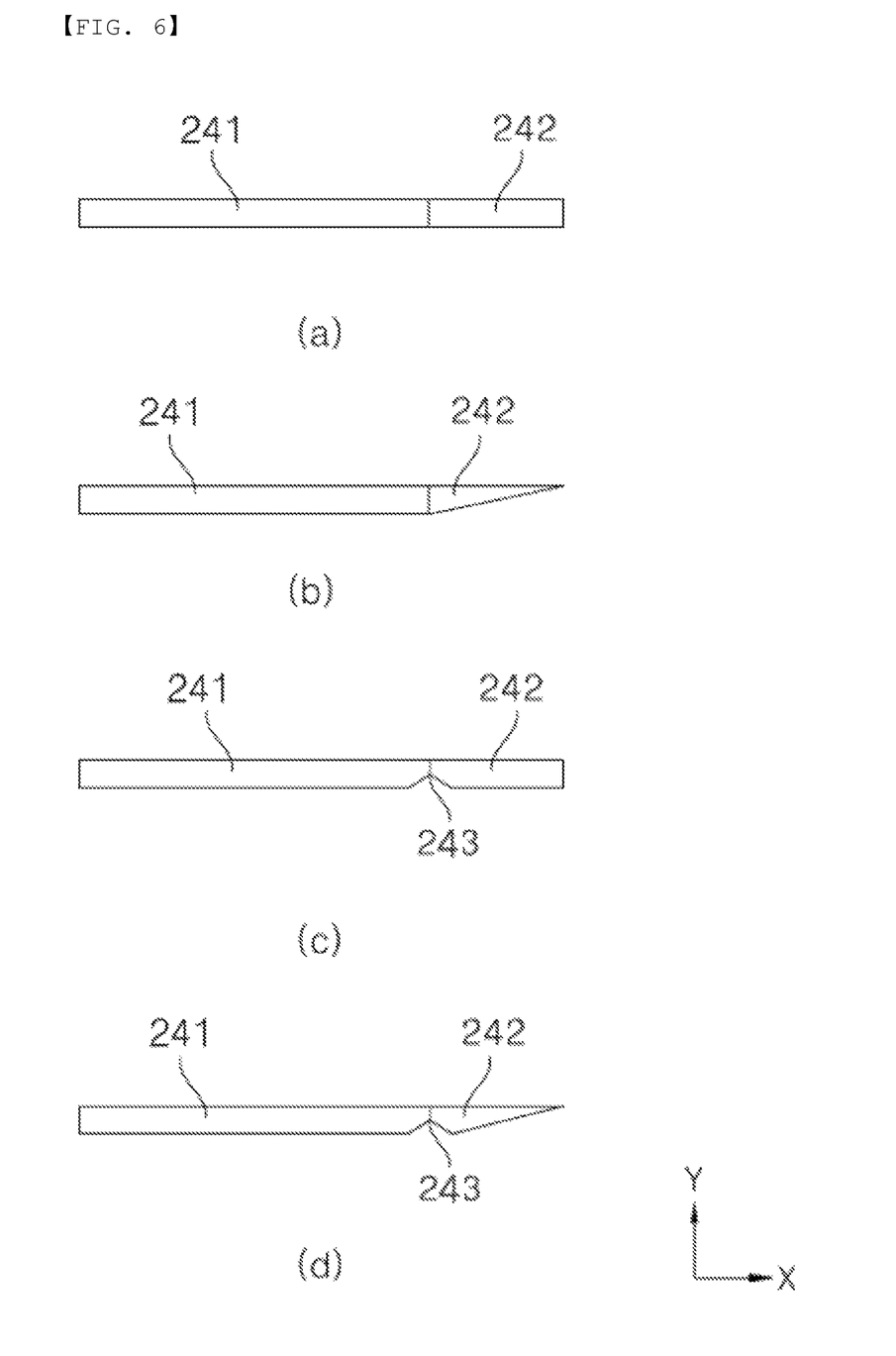
FIG. 6 is a sectional view illustrating breaking units according to preferred modifications of the present invention.

FIG. 6 is a sectional view illustrating breaking units according to preferred modifications of the present invention.

Referring to FIG. 6, the breaking unit 240 may be configured such that a coupling portion 241 and a blade portion 242 extend so as to have the same thickness, as shown in (a) of FIG. 6. In this case, it is possible to easily manufacture the breaking unit.

The breaking unit 240 shown in (b) of FIG. 6 is configured such that a blade portion 242 extending from a flat coupling portion 2421 has a thickness gradually decreasing with increasing distance from the edge of the coupling portion 241, specifically the blade portion has a triangular shape somewhat spaced apart from one side of the battery cell 100. In this case, the tip end of the blade portion 242 is very sharp, whereby it is possible to easily rupture the fire-extinguishing pack 210.

The breaking unit 240 shown in (c) of FIG. 6 is configured such that a coupling portion 241 and a blade portion 242 extend so as to have the same thickness, in the same manner as shown in (a) of FIG. 6, and a recessed portion 243 having a predetermined depth is further formed in the portion at which the coupling portion 241 and the blade portion 242 are connected to each other. When voltage is generated due to swelling of the battery cell 100, therefore, the blade portion 242 may be more sensitively deformed.

The breaking unit 240 shown in (d) of FIG. 6 is configured such that a blade portion 242 extending from a flat coupling portion 241 has a thickness gradually decreasing with increasing distance from the edge of the coupling portion 241, in the same manner as shown in (b) of FIG. 6, and a recessed portion 243 having a predetermined depth is formed in the portion at which the coupling portion 241 and the blade portion 242 are connected to each other. Consequently, the blade portion 242 may be easily deformed, as described with reference to (c) of FIG. 6. Although the recessed portion 243 is shown as being provided at only one side of the coupling portion in the figures, one recessed portion may be provided at each of opposite sides of the coupling portion.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Battery cell
110: Electrode lead
200: Fire-extinguishing unit
210: Fire-extinguishing pack
220: Piezoelectric element
230: Connection circuit
240: Breaking unit
241: Coupling portion
242: Blade portion
243: Recessed portion

The invention claimed is:

1. A battery module having comprising:
a plurality of battery cells stacked in a first direction; and
a plurality of fire-extinguishers respectively located adjacent to the plurality of battery cells,
wherein each of the plurality of fire-extinguishers comprises a fire-extinguishing pack containing a fire-extinguishing material, a piezoelectric element interposed between a respective battery cell and the fire-extinguishing pack, and at least one breaking unit interposed between the respective battery cell and the fire-extinguishing pack, wherein the breaking unit comprises: a coupler fixed to the respective battery cell or the fire-extinguishing pack; and a blade extending from the-coupler, wherein the blade is made of an electroactive polymer.

2. The battery module according to claim 1, wherein the fire-extinguishing pack is in contact with one surface or opposite surfaces of the respective battery cell.

3. The battery module according to claim 1, wherein the piezoelectric element is located at a middle of one surface of the respective battery cell, and
wherein a connection circuit is provided between the piezoelectric element and the breaking unit.

4. The battery module according to claim 1, wherein the breaking unit is located adjacent to an electrode lead of the respective battery cell.

5. The battery module according to claim 1, wherein the blade is deformed by a predetermined angle by voltage generated from the piezoelectric element to rupture the fire-extinguishing pack.

6. The battery module according to claim 1, wherein the blade is a plurality of blades along a plurality of edges of the coupler.

7. The battery module according to claim 1, wherein the blade has a thickness equal to a thickness of the coupler.

8. The battery module according to claim 7, wherein a recessed portion is formed where the blade and the coupler are connected to each other.

9. The battery module according to claim 1, wherein the blade has a thickness gradually decreasing with increasing distance from an edge of the coupler.

10. The battery module according to claim 9, wherein a recessed portion is formed where the blade and the coupling portion are connected to each other.

11. A battery pack comprising the battery module according to claim 1.

* * * * *